Feb. 15, 1966 E. R. KNOWLES 3,235,639
SOLID FLANGED THERMOPLASTIC ARTICLES AND
APPARATUS AND METHOD FOR MAKING THE SAME
Filed May 7, 1963
3 Sheets-Sheet 1
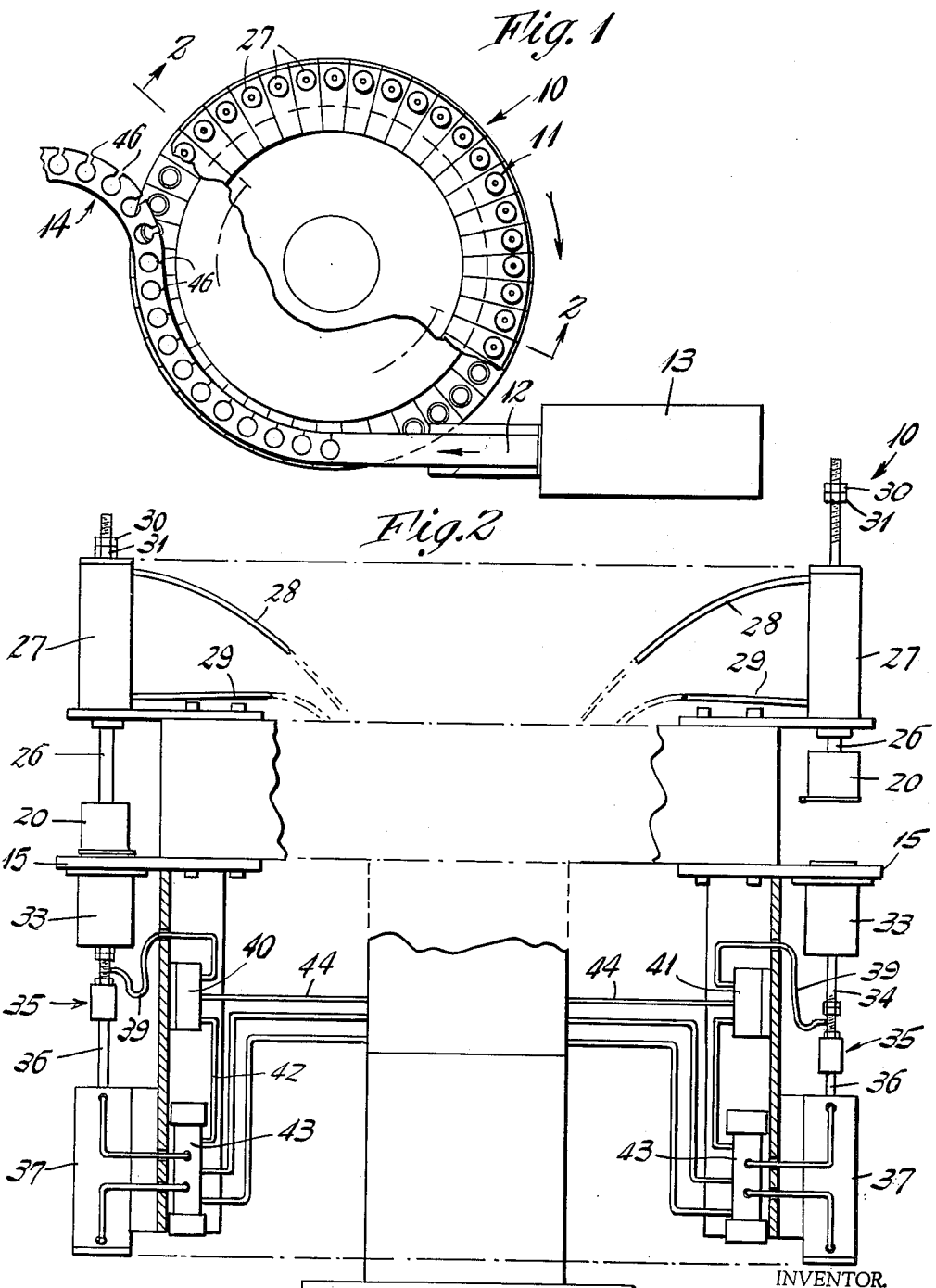
INVENTOR.
Edward R. Knowles
BY
Johnson and Kline
ATTORNEYS

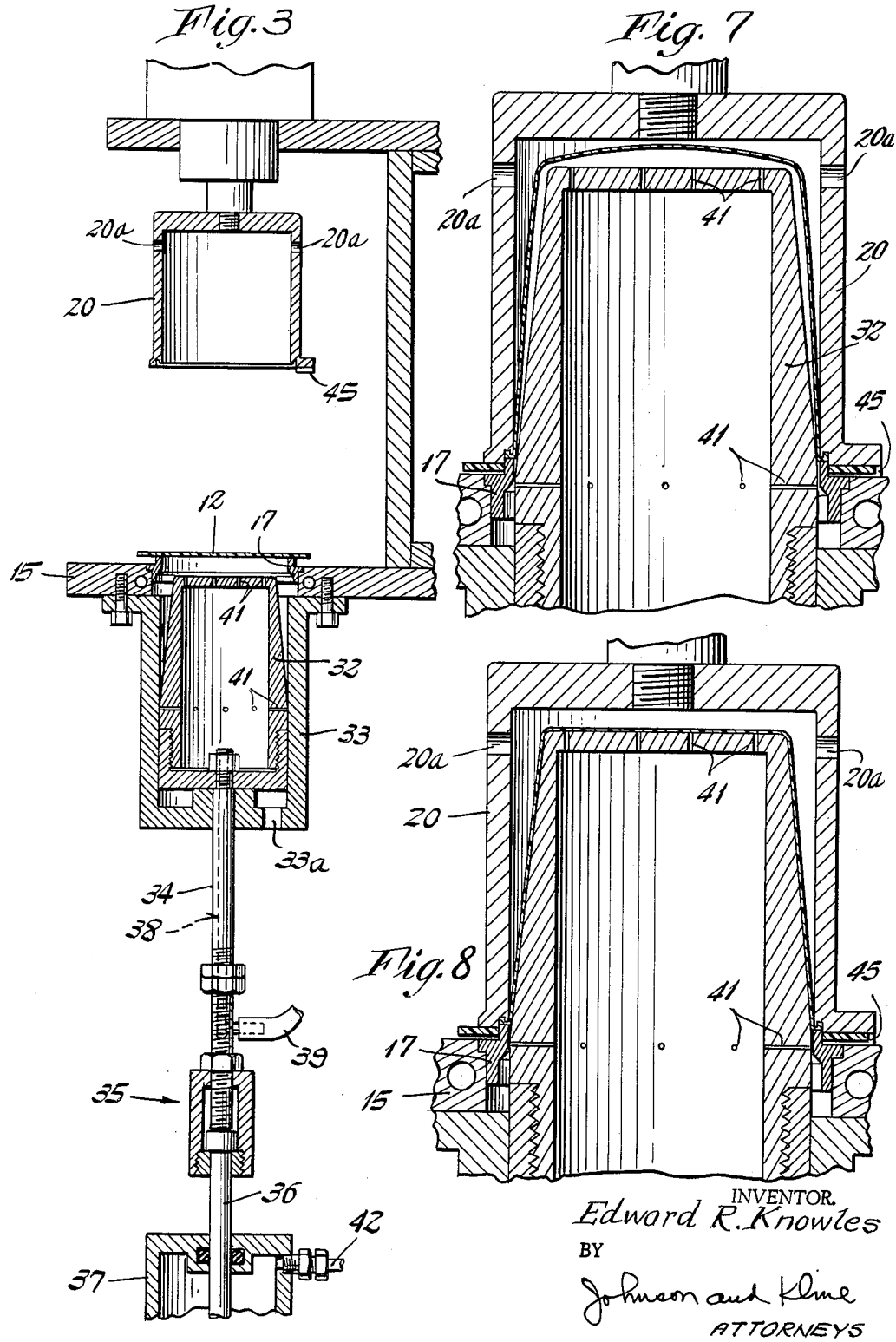

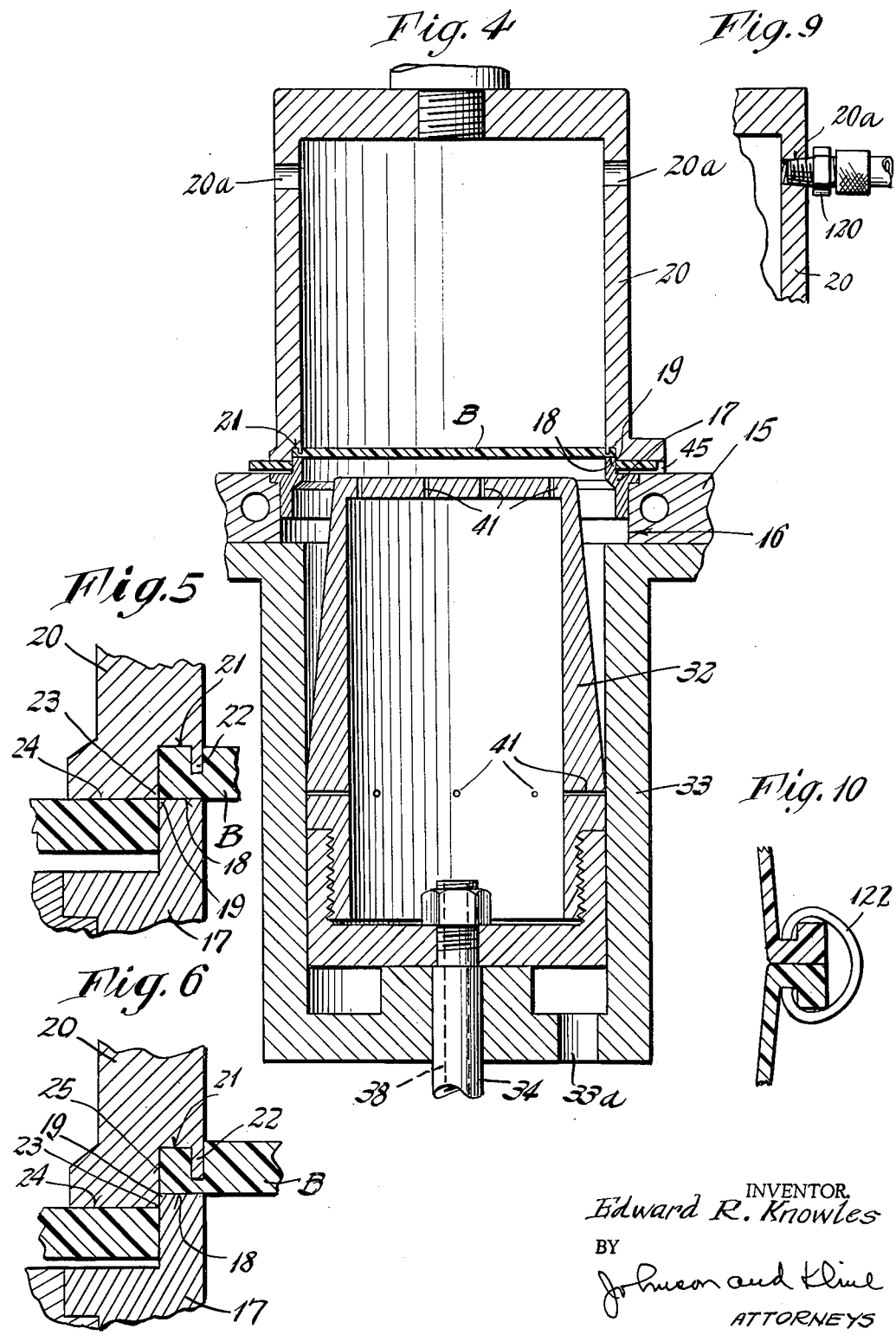

United States Patent Office 3,235,639
Patented Feb. 15, 1966

3,235,639
SOLID FLANGED THERMOPLASTIC ARTICLES AND APPARATUS AND METHOD FOR MAKING THE SAME
Edward R. Knowles, North Billerica, Mass., assignor to American Can Company, New York, N.Y., a corporation of New Jersey
Filed May 7, 1963, Ser. No. 278,639
10 Claims. (Cl. 264—92)

The present invention relates to a novel flanged article and to an apparatus and method for making the same. The invention has particular utility in forming flanged containers of thermoplastic material.

Heretofore, articles, such as containers for storing material, have been made by drape forming or the like with the body around the open end thereof formed or shaped to provide an open or hollow bead. The bead, however, did not provide a sufficiently rigid portion for certain operations as may be employed in closing the container. Also, efforts to injection mold containers have been made, but these containers are subject to the same difficulties as noted and, in addition, require more material and are thus more costly. Also, the injection molded containers have stresses in the walls thereof which result in cracking of the container when subjected to low freezing temperatures.

The present invention overcomes these difficulties by providing a stretch-formed container or the like article with a substantially rigid solid flange around the open end thereof, which flange is thicker than the remaining stretched body of the container and is provided with a molded outer edge to more readily receive and/or interlock with a closure for the container.

The present invention also provides a novel apparatus and method for producing the containers with a substantially rigid solid flange in a simple, yet effective manner, said apparatus having means therein for clamping the material of the flange and means for holding the material from lateral movement inwardly from the clamping area during the stretching of the remainder of the material to form the body of the container, and also having novel means for molding the flange after it has been severed from the sheet material to provide a smooth molded edge on the flange.

The present invention is equally applicable to a single cavity die or a multiple cavity die as required, and the body can be stretch-formed in various ways so long as the body itself becomes thinner than the flange.

Other features and advantages of the invention will be apparent from the specification and claims when considered in connection with the accompanying drawings in which:

FIGURE 1 is a top view, partly broken away, of a machine embodying the present invention showing a plurality of forming units carried by a rotating table.

FIG. 2 is a side view of the machine taken along line 2—2 of FIG. 1.

FIG. 3 is a sectional view of the device with the thermoplastic material in position over the aperture.

FIG. 4 is a sectional view of the device with the clamping means in position and the blank formed from the sheet material.

FIG. 5 is an enlarged fragmentary view showing the severing of the blank prior to the molding of the edge.

FIG. 6 is a view similar to FIG. 5 showing the clamping means in position to mold the edge.

FIG. 7 is a sectional view showing the stretched material with the core pin in position therein.

FIG. 8 is a view similar to FIG. 7 with the material forced into molding relation with the core pin.

FIG. 9 is a fragmentary view showing another vent means for the bell.

FIG. 10 is a fragmentary view showing the flanges of two flanged articles secured together to form a closed hollow device.

While the present invention may be used as a single cavity arrangement or as a multi-cavity platen-type press, in the illustrated form of the invention it is shown in connection with a rotating table or wheel 10 having a plurality of molding devices or units 11 positioned around the periphery. A ribbon or strip 12 of warm thermoplastic material which can be formed into sheet material, such as high impact styrene, polypropylene and polyethylene, polyvinyl chlorides, acrylic resins and the like, is fed from an extruder 13 and extends tangentially over the edge of the table, as shown in FIG. 1, and becomes associated with each of the molding devices or units in succession as the table rotates to supply the material thereto for forming the article. The excess strip indicated at 14 is then directed away from and removed from the table after the blanks have been cut therefrom and the molded containers are thereafter removed by air pressure or other suitable stripping means.

Each of the molding devices or units 11 comprises a base portion 15, herein illustrated as the table top, having an aperture 16 therein. Preferably, the aperture is lined with a hardened ring 17 over which the sheet thermoplastic material 12 is disposed. The ring has an upstanding flange whose top surface 18 provides a champing surface and upper outer edge 19 provides a shearing surface. Carried by the device and cooperating with the hardened ring is a clamping member, herein illustrated as a bell-type member 20 having a recessed clamping face 21 along the inner portion of its lower edge which overlies and is normally urged into cooperative relation with the top face 18 of the hardened ring to clamp the material therebetween.

To prevent lateral movement of the material in the clamped portion of the sheet material which is adapted to form the flange for the article, means are provided for interlocking with the material. While this can be formed on either clamping surface or on both, in the illustrated form of the invention, as noted in FIGS. 5 and 6, the inner edge of the clamping portion 21 of the bell is provided with a projection or lip 22 which enters into the edge portion of the blank and interlocks therewith and effectively prevents lateral shifting of the material in the clamped portion. As the bell moves into clamping engagement with the material, the lower edge 23 thereof cooperates with the shearing surface 19 of the ring, as shown in FIG. 5, to provide a severing means for severing the excess of the sheet thermoplastic material around the clamped portion and forming a blank B overlying the aperture. Continued movement of the bell to the position of FIG. 6 causes the bottom surface 24 thereof to move the excess thermoplastic material down, and the wall 25 of the recess extending between edge 23 and clamping surface 21 provides a molding chamber for the edge of the clamped material. Since the clamped material cannot flow inwardly due to the lip 22, the pressure on the clamped material caused by the further movement of the clamping face will cause the rough, raw severed edge of the flange to be pressed against the wall 25 and molded into a smooth surface which greatly facilitates the application of closures thereto.

While the bell 20 can be moved into and out of clamping relation by the various mechanical movements, in the illustrated form of the invention it is moved to clamping position by means of a piston-operated rod 26 disposed in a cylinder 27 to be connected by conduits 28, 29 to a main fluid supply (not shown) on the machine provided with the usual control valve. The portion of the rod 26 projecting above the cylinder is provided with a pair of nuts 30, 31 threaded on the end thereof and forms an adjustable stop for controlling the movement of the bell in the position shown in FIG. 6 wherein the bottom edge of the bell is disposed below the upper edge of the hardened ring so as to insure molding of the flange.

The central portion of the blank B within the clamped annular rim or flange is then stretched by providing a difference in pressure on opposite sides thereof to form the body of the container.

While this material may be sucked into a molding cavity, such as the interior of the bell, to shape it, in the illustrated form of the invention it is stretched by having pressure supplied to the undersurface thereof with the bell provided with vent openings 20a to permit free movement of the material during the stretching thereof and is molded on a molding means or core pin 32. As the material of the blank stretches, the lip 22 prevents inward movement of the material so that the solid rim or flange maintains its thickness and substantial rigidity while the material of the body stretches to a thinner wall.

The molding means or core pin 32 is mounted for sliding movement in a cylinder 33 secured to the underside of the table and located below the aperture. The cylinder has a vent 33a to permit free sliding of the core pin in the cylinder. The core pin is connected to a pushrod 34 which is connected by a lost motion connection 35 to a piston-operated rod 36 operable in a cylinder 37 carried by the molding unit as shown in FIGS. 2 and 3. The pushrod 34 is operable to move the core pin from a retracted position, as shown in FIGS. 3 and 4, to a projected position as shown in FIG. 7 wherein it is disposed within the stretched material. The pushrod has a central passage 38 therein communicating with the interior of the core pin and connected by a flexible conduit 39 to a control valve 40 by which the passage can be connected to a source of pressure and/or vacuum as may be required. The core pin is provided with small passages 41 communicating with the underside of the blank so that when connected to source of pressure it creates a difference in pressure on opposite sides of the sheet material and causes the material to be stretched in the manner shown in FIG. 7 in advance of the core pin.

While a separate source of fluid under pressure may be employed to provide the required amount of fluid and pressure to stretch the blank, in the illustrated form of the invention the exhaust side of cylinder 37, as the pin is projected upwardly, is connected by a line 42 to a valve 43 and to the control valve 40 to cause the fluid from the exhaust end to be delivered under pressure to the passage 38 in the pushrod as the piston-operated rod moves the core pin upwardly to the molding position of FIG. 7. When the core pin is in its molding position, the control valve connects the vacuum line 44 to apply a suction to the interior of the core pin and this causes the thermoplastic material to be sucked down and forced against the core pin, as shown in FIG. 8 and to be shaped to the shape of the core pin.

To facilitate stripping of the surplus sheet material from the molds after the blanks have been cut therefrom, the bell is provided with a cutter element 45 which splits the inside edge of the strip of excess material 14 as at 46 so that it can be stripped off the molds, as shown in FIG. 1.

It will be seen, therefore, that the present invention produces a novel flanged container in which the solid integral flange is substantially thicker than the stretched body of the container and provides a more rigid flange to which closures may be attached by crimping, heat sealing or a friction grip and which provides a smooth molded outer edge on the flange for facilitating the connection of the closure thereto. Also, the depression formed in the underside of the flange by the lip 22 can be employed, where desired, to aid in interlocking a closure to the flange. The containers as stretch-formed by the present invention have a smooth, highly finished outer surface and readily nest without sticking. Further, by properly shaping the core pin, various desired configurations can be obtained, for example, to provide the usual snap-in internal lid seats or the like, or to provide the usual threads for receiving and interlocking a closure thereto.

While the invention has been described herein as applied to an open ended, frusto-conical container, it is to be understood that it can be employed to make flanged articles other than containers and having shapes other than circular or frusto-conical. Also, two flanged articles may be joined to form a closed hollow device by having the flanges thereof secured together in face-to-face relation by friction welding, adhesive and/or a metal band 122 clamped thereover as shown in FIG. 10.

When heavy thick materials are used in making the large or heavy articles, the venting aperture 20a can be connected to a fitting 120, as shown in FIG. 9, which fitting can communicate with a source of pressure (not shown) so that pressure can be applied through the aperture 20a to aid the suction within the core pin in forcing the blank into molding or shaping relation around the core pin.

Variations and modifications may be made within the scope of the claims and portions of the improvements may be used without others.

I claim:

1. A method of forming an open-ended thermoplastic flanged container from thermoplastic sheet material comprising the steps of heating said sheet material to molding temperature, simultaneously clamping an annular portion of said heated sheet material and molding within said annular portion the flange for said container with an elongated depression therein spaced inwardly from the peripheral edge thereof, stretching and molding the material surrounded by said clamped portion to form the side walls and bottom of said container, and maintaining said clamping and the shape and size of said molded flange during said stretching and side wall and bottom molding to prevent the material in said clamped portion from flowing inwardly during said stretching and side wall and bottom molding whereby the flange of said flanged container is thicker and more rigid than said side walls and bottom.

2. The method set forth in claim 1 wherein a portion of said heated sheet material outside of said clamped portion is severed from said clamped portion prior to said stretching and molding.

3. The method set forth in claim 1 including the steps of applying fluid pressure in one direction to stretch the material surrounded by said clamped portion into an approximation of the side walls and bottom of the container, and thereafter reversing the direction of said fluid pressure to mold said approximation into final shape on the exterior surface of a male element.

4. In a device for molding a flanged article, a base having an aperture therein and adapted to support sheet thermoplastic material overlying said aperture, and a movable member having a recess therein providing a clamping face, said clamping face being movable with said member toward said base for clamping a portion of said thermoplastic material between said base and said face around said aperture and for forming the flange of said article in said clamped portion, said member having means for severing the material outside of said clamping face to form a blank, said clamping face having rigid means of sufficient size and shape projecting therefrom to form an elongated depression in said clamped material for interlocking therewith to prevent lateral movement of said clamped portion during subsequent operations to form said article, said recess having an outer wall operable to mold the severed edge of said blank in response to continued movement of said member after severing said blank whereby a smooth edge is provided on said flange.

5. In a device for molding a flanged article, a base having an aperture therein and adapted to support sheet thermoplastic material overlying said aperture, a movable member having a recess therein providing a clamping face, said clamping face being movable with said member toward said base for clamping a portion of said thermoplastic material between said base and said face and for forming the flange of said article in said clamped portion, rigid means of sufficient size and shape projecting from said face to form an elongated depression in said material for interlocking with said clamped material to prevent inward lateral movement of said clamped portion during subsequent operations to form said article, means causing a difference of pressure on opposite sides of the material surrounded by said clamped portion to stretch the same and move it out of the plane of said clamped portion, mold means having the shape of said article to receive said stretched material, and fluid pressure means forcing said stretched material into contact with said mold means to mold said stretched material to the shape thereof to form said flanged article in which said flange is thicker than the stretched portion of said article.

6. In a device for molding a flanged article, a base having an aperture therein and adapted to support sheet thermoplastic material overlying said aperture, a movable member having a recess therein providing a clamping face, said clamping face being movable with said member toward said base for clamping a portion of said thermoplastic material between said base and said face and for forming the flange of said article in said clamped portion, means for severing the material outside of said clamped portion from said sheet material to form a blank, rigid means of sufficient size and shape projecting from said face to form an elongated depression in said blank for interlocking therewith to prevent lateral movement of said clamped portion during subsequent operations to form said article, means causing a difference of fluid pressure on opposite sides of the blank portion surrounded by said clamped portion to stretch said blank portion and move it out of the plane of said clamped portion, mold means having the shape of said article to receive said stretched blank portion, and fluid pressure means forcing said stretched blank portion into contact with said mold means to mold said stretched blank portion to the outer shape thereof to form said flanged article in which said flange is thicker than the stretched portion of said article.

7. In a device for molding a flanged container, a base having an aperture therein and adapted to support sheet thermoplastic material overlying said aperture, a movable member having a recess therein providing a clamping face, said clamping face being movable with said member toward said base for clamping a portion of said thermoplastic material between said base and said face and for forming the flange of said article in said clamped portion, said member having means for severing material from said sheet material to form a blank, rigid means of sufficient size and shape projecting from said face to form an elongated depression in said blank for interlocking therewith to prevent lateral movement of said clamped portion during subsequent operations to form said article, means causing a difference of fluid pressure on opposite sides of the blank portion surrounded by said clamped portion to stretch said blank portion and move it out of the plane of said clamped portion, a core pin having the shape of the body of said container movable into cooperative relation with said stretched blank portion, and fluid pressure means forcing said stretched blank portion into contact with said core pin to mold said stretched blank portion to the outer shape thereof to form said flanged container in which said flange is thicker than the stretched body portion of said container.

8. In a device for molding a plurality of flanged articles, a base having a plurality of apertures therein and adapted to support sheet thermoplastic material overlying said apertures, movable means having recesses therein providing clamping faces, each of said clamping faces being movable with said movable means towards said base for clamping a portion of said thermoplastic material between said base and each of said faces around each of said apertures and for forming the flange of each of said articles in each of said clamped portions, rigid means of sufficient size and shape projecting from each of said faces to form elongated depressions in said material for interlocking therewith to prevent lateral movement of said clamped portions during subsequent operations to form said articles, means causing a difference of pressure on opposite sides of the portions of said material surrounded by said clamped portions to stretch said material portions and move them out of the plane of said clamped portions, mold means for each of said apertures having the shape of said articles to receive said stretched material, and fluid pressure means forcing said stretched material into contact with said mold means to mold said stretched material to the outer shape thereof to form said flanged articles having substantially rigid flanges which are thicker than the stretched portions of said articles.

9. In an apparatus for molding a plurality of flanged containers, a rotary table having a plurality of molding devices around the periphery thereof, each of said devices having a base provided with an aperture therein to accommodate a strip of thermoplastic sheet material fed tangentially to said table with the material overlying said apertures, movable means having recesses therein providing a clamping face on each of said molding devices, each clamping face being movable with said movable means toward said base for clamping a portion of the strip of thermoplastic material between said base and each face around each aperture and for forming the flange of each of said containers in each clamped portion, rigid means of sufficient size and shape projecting from each face to form elongated depressions in said material for interlocking therewith to prevent lateral movement of each clamped portion during subsequent operations to form said containers, means causing a difference of fluid pressure on opposite sides of the portions of said material surrounded by each clamped portion to stretch said material portions and move them out of the plane of each clamped portion, mold means for each aperture having the shape of said containers to receive said stretched material, and fluid pressure means forcing said stretched material into contact with said mold means to mold said stretched material to the shape thereof to form said flanged containers having substantially rigid flanges, said molded containers being discharged from said table at a point remote from that whereat said strip material is fed to said table.

10. In an apparatus for molding a plurality of flanged containers, a rotary table having a plurality of molding devices around the periphery thereof, each of said devices having a base provided with an aperture therein to accommodate a strip of thermoplastic sheet material fed tangentially over the edge of said table with the material overlying said apertures, movable means having recesses therein providing a clamping face on each of said devices, each clamping face being movable with said movable means toward said base for clamping portions of the strip of thermoplastic material between said base and each face around each aperture for forming the flange of each of said containers, in each clamped portion, means for severing the material of the strip around each clamped portion to form a blank over each aperture, means for removing the remaining strip from around each of said molding devices, means for molding the severed edge of each blank to provide a smooth surface thereon, rigid means of sufficient size and shape projecting from each clamping face to form an elongated depression in each blank for interlocking therewith to prevent lateral movement of each clamped portion inwardly during subsequent operations to form said containers, means causing a difference of fluid pressure on opposite sides of the portion of each blank surrounded by said clamped portion to stretch each blank portion and move it out of the plane of each clamped portion, a core pin for each aperture having the shape of the body of the container and movable into cooperative relation with its adjacent stretched blank portion, fluid pressure means forcing each stretched blank portion into contact with its adjacent core pin to mold said stretched blank portion to the outer shape thereof to form said flanged containers having substantially rigid flanges which are thicker than the stretched portion of the container, said molded containers being discharged from said table at a point remote from that whereat the strip material is fed to said table.

References Cited by the Examiner

UNITED STATES PATENTS

| | | | |
|---|---|---|---|
| 1,912,186 | 5/1933 | Fullman et al. | 18—19 |
| 2,468,697 | 4/1949 | Wiley | 18—56 |
| 2,694,227 | 11/1954 | Fordyce et al. | 18—19 X |
| 2,702,411 | 2/1955 | Winstead | 18—56 |
| 2,744,288 | 5/1956 | Fienberg et al. | 18—20 |
| 2,854,694 | 10/1958 | Mumford | 18—19 |
| 2,878,513 | 3/1959 | Slaughter | 18—19 |
| 2,891,280 | 6/1959 | Politis | 18—19 |
| 2,893,456 | 7/1959 | Wallace | 150—0.5 |
| 2,910,728 | 11/1959 | Rowe | 18—19 |
| 2,914,104 | 11/1959 | Jocelyn | 150—0.5 |
| 2,952,035 | 9/1960 | Gora. | |
| 2,953,814 | 9/1960 | Mumford | 18—19 |
| 2,989,780 | 6/1961 | Zimmerman | 18—19 X |
| 3,027,596 | 4/1962 | Knowles | 18—19 |
| 3,041,669 | 7/1962 | Marshall et al. | 18—19 |
| 3,044,117 | 7/1962 | Alspach et al. | 18—20 |
| 3,054,144 | 9/1962 | Goodwin et al. | 18—19 |
| 3,074,110 | 1/1963 | Mard et al. | 18—19 X |
| 3,091,808 | 6/1963 | Dakin | 18—19 |

FOREIGN PATENTS

| | | |
|---|---|---|
| 1,285,092 | 1/1962 | France. |

WILLIAM J. STEPHENSON, *Primary Examiner.*